Jan. 7, 1936.  R. F. KRAUSE  2,026,839
TEAKETTLE SPOUT
Filed April 2, 1932

Inventor
R. F. Krause
By Frease and Bishop
Attorneys

Patented Jan. 7, 1936

2,026,839

UNITED STATES PATENT OFFICE 2,026,839

TEAKETTLE SPOUT

Richard F. Krause, Massillon, Ohio, assignor to The Enterprise Aluminum Company, Massillon, Ohio, a corporation of Ohio Application April 2, 1932, Serial No. 602,779

1 Claim. (Cl. 53—9)

The invention relates to spouts for cooking utensils such as teakettles, teapots and the like and more particularly to a one-piece spout having means thereon for permanently connecting the spout to the kettle or the like without requiring the use of rivets or other separable fastening means.

Recent development in the metal cooking utensil industry has resulted in the production of utensils which are lighter in weight and easier to handle, and which can be manufactured at a considerably reduced cost. The production of these lightweight utensils has greatly increased the difficulty of attaching spouts to teakettles and similar vessels, and the means of attachment which have been employed heretofore have been found to be particularly unsatisfactory for such lightweight utensils.

The present invention therefore contemplates a means of attachment which overcomes the difficulties and objections to present methods and which not only lends itself to the requirements of lightweight utensils resulting in an attachment comparable in strength and serviceabiity with that of heavier gauge utensils, but which is applicable to utensils having walls of various gauges.

The invention relates more especially to sheet metal cooking utensils and more particularly to utensils of soft metal such as aluminum and the like.

The object of the improvement is to provide a spout for teakettles and the like having integral attaching means thereon for easily and effectively securing the spout permanently to the teakettle or other utensil.

The above and other objects may be attained by forming the spout with an angular flange at its base, said flange being provided with a plurality of integral studs adapted to be received through suitable apertures surrounding an opening in the side wall of the kettle, the inner protruding ends of said studs being adapted to be riveted or clinched upon the inside of the kettle wall so as to securely and permanently attach the spout to the kettle.

The inner or base end of the spout may protrude through said opening in the kettle wall so as to form a tight closure at the point of communication between the kettle and spout and the inner ends of said studs are preferably countersunk so as to facilitate the riveting or clinching thereof against the inside of the kettle wall.

Figure 1:
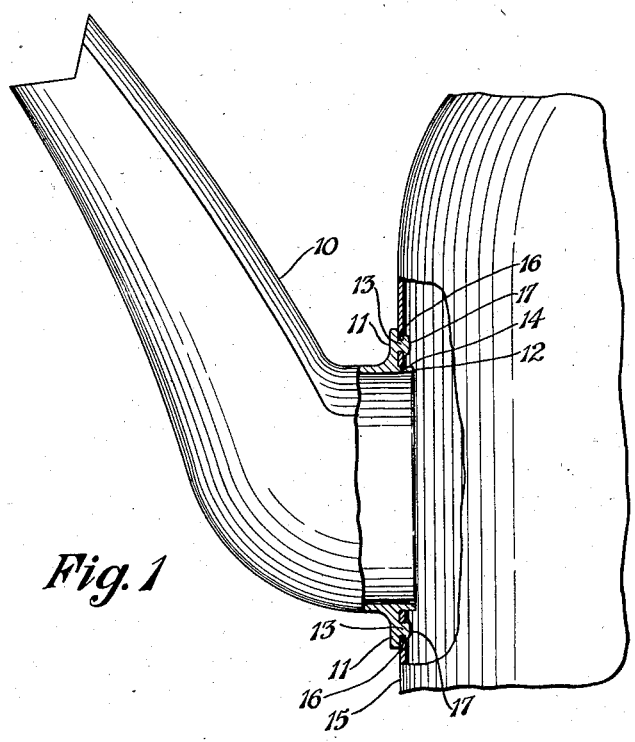
Figure 2:
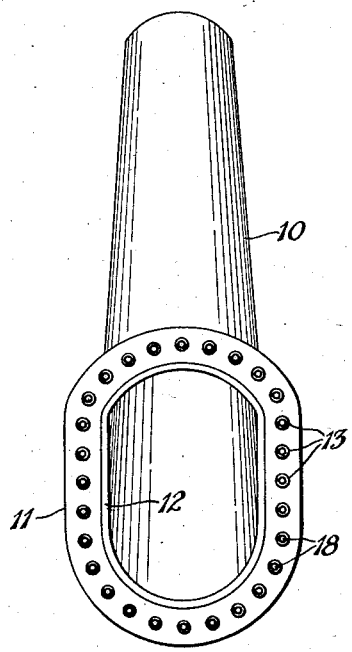
Figure 3:
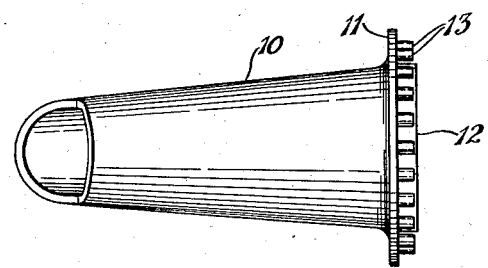

An embodiment of the invention is illustrated in the accompanying drawing, in which Figure 1 is a sectional view of a portion of a kettle showing the improved spout attached thereto;

Fig. 2, a rear elevation of the spout showing the condition of the same before it is attached to the kettle;

Fig. 3, a top plan view of the spout in the condition shown in Fig. 2; and

Figure 4:
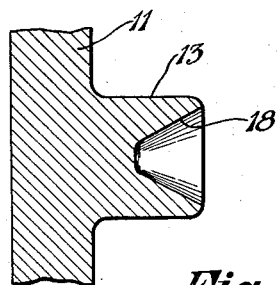

Fig. 4, an enlarged sectional view through one of the integral studs upon the spout showing the manner in which the same is countersunk.

Similar numerals refer to similar parts throughout the drawing.

The improved spout to which the invention pertains is indicated generally at 10 and may be in the form of a die casting or the like, preferably of aluminum or similar material having the angular flange 11 at its base portion preferably spaced slightly from the inner or base end of the spout which is indicated generally at 12. A multiplicity of studs 13 is formed upon the inner side of the flange 11, entirely surrounding and spaced from the inwardly projecting base end 12 of the spout.

As shown in Figs. 2 and 3, these studs 13 are spaced apart a distance substantially equal to the diameter of one of the studs and extend entirely around the inner face of the flange 11, thus insuring a tight fit of the spout upon the kettle or other utensil to which it is attached.

An opening 14 is formed in the side wall 15 of the kettle or other utensil to which the spout is to be attached, said opening conforming in size and shape to the inwardly projecting base end 12 of the spout.

A plurality of small apertures 16, conforming to the position of the studs 13, is provided surrounding the opening 14 and the inwardly projecting base end 12 of the spout is then inserted into the opening 14, the studs 13 being at the same time received through the apertures 16.

The inner ends of the studs 13 are then riveted or clinched against the inside of the kettle wall 15, as indicated at 17, firmly attaching the spout to the utensil and forming a water-tight joint between the parts.

To facilitate the riveting or clinching of the studs the inner end of each stud may be countersunk, as shown at 18.

From the above it will be seen that a one-piece spout is provided for attachment to a kettle or the like without necessitating the use of rivets, bolts or other attaching means, thus providing for easily and readily attaching the spout to the utensil and providing a water-tight joint.

I claim:

A vessel having wall portions of uniform thin gauge metal, a spout therefor having a peripheral attaching flange provided with a plurality of rivet studs and a second attaching flange, said rivet studs and said second attaching flange extending through apertures in said thin wall portions of said vessel, said rivet studs headed and said second attaching flange arranged in tight-pressed frictional engagement with the walls of the aperture through which it extends to lock the spout to the vessel, said second attaching flange projecting beyond the inner surface of the vessel wall and the heads of said rivet studs around the entire periphery of the aperture.

RICHARD F. KRAUSE.